Figures 1, 17, 21:
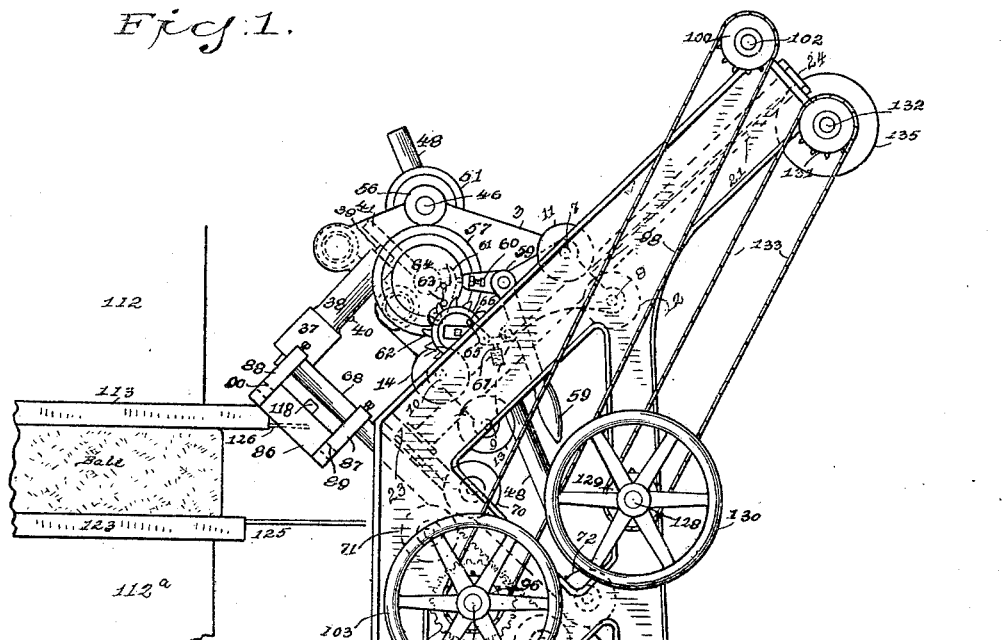

No. 690,037. Patented Dec. 31, 1901.
F. B. SHUSTER.
BALE TYING ATTACHMENT FOR COMPRESSORS.
(Application filed June 8, 1899.)
(No Model.) 5 Sheets—Sheet 1.

WITNESSES
INVENTOR
Franklin B. Shuster
By his Atty.
Geo. D. Phillips

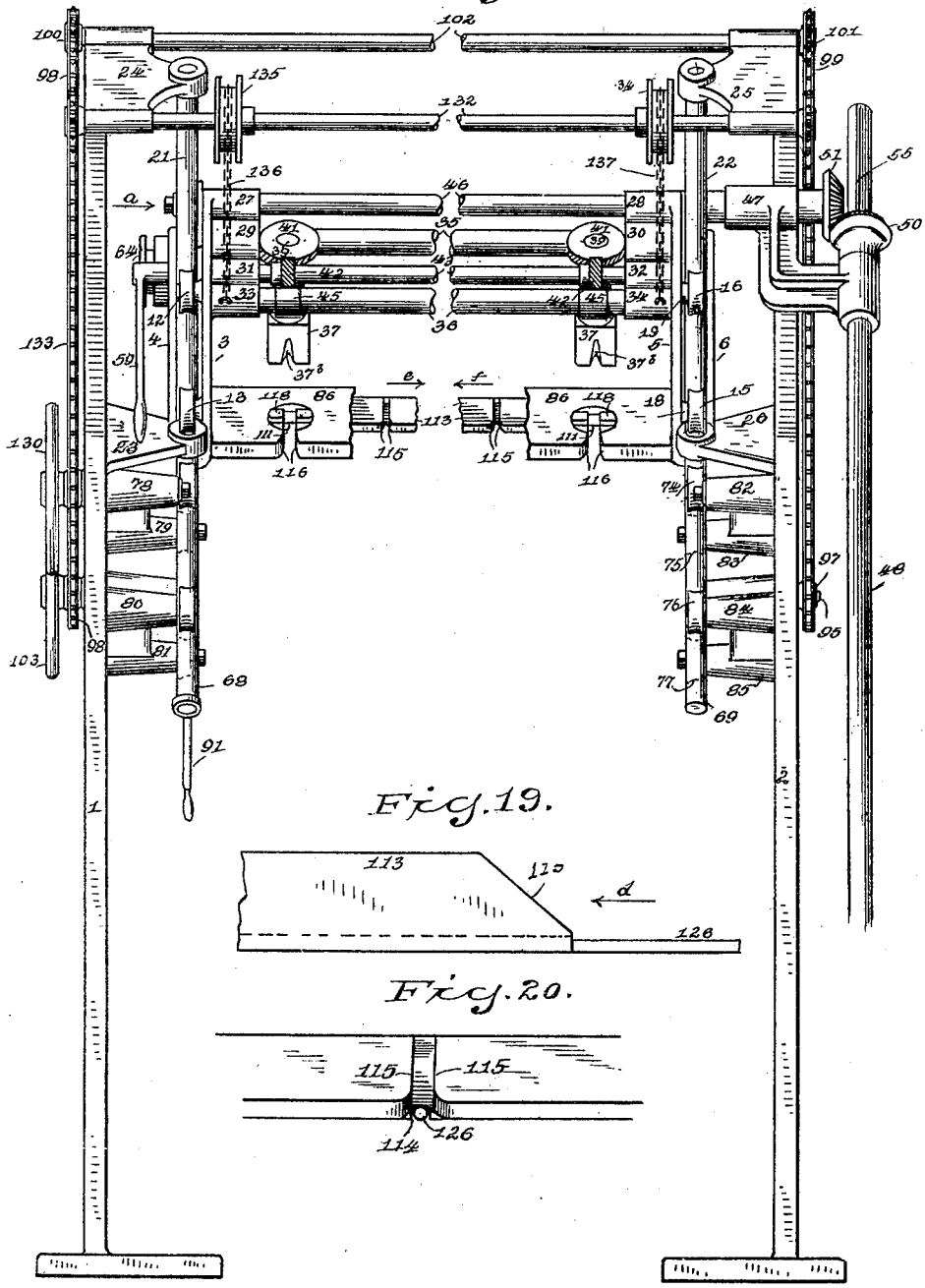

No. 690,037. Patented Dec. 31, 1901.
F. B. SHUSTER.
BALE TYING ATTACHMENT FOR COMPRESSORS.
(Application filed June 8, 1899.)
(No Model.) 5 Sheets—Sheet 3.
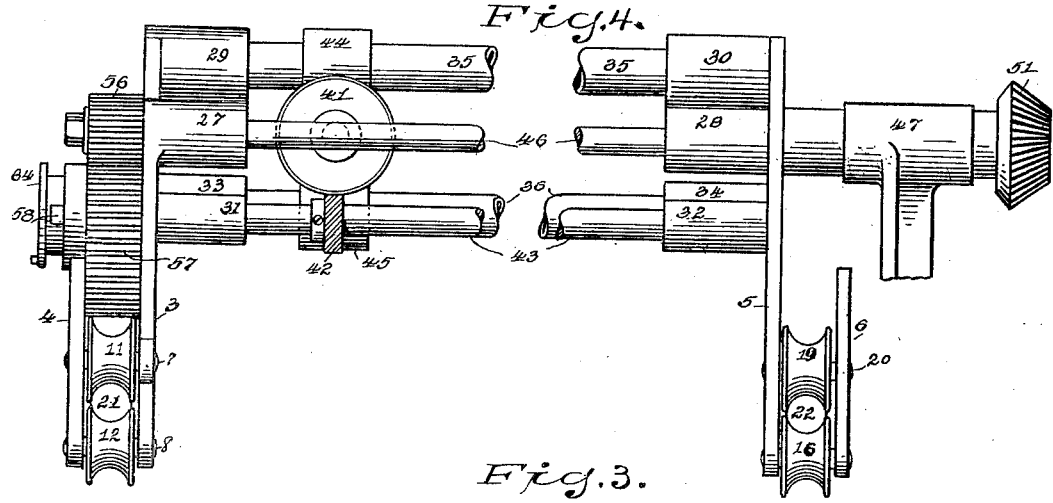
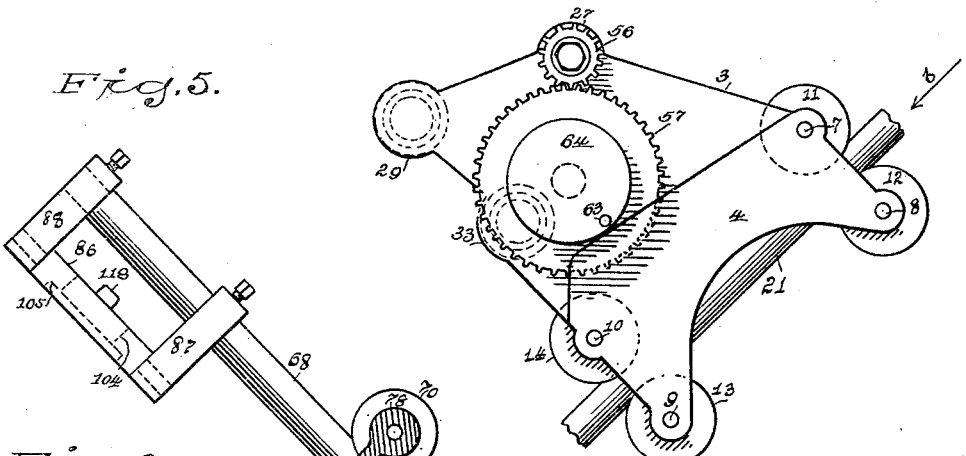
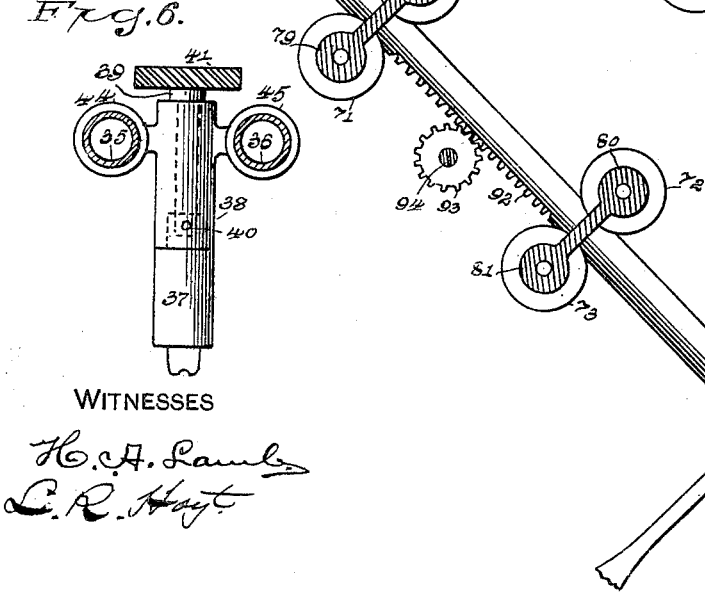
WITNESSES
INVENTOR
Franklin B. Shuster
By his Atty.

No. 690,037. Patented Dec. 31, 1901.
F. B. SHUSTER.
BALE TYING ATTACHMENT FOR COMPRESSORS.
(Application filed June 8, 1899.)
(No Model.) 5 Sheets—Sheet 4.
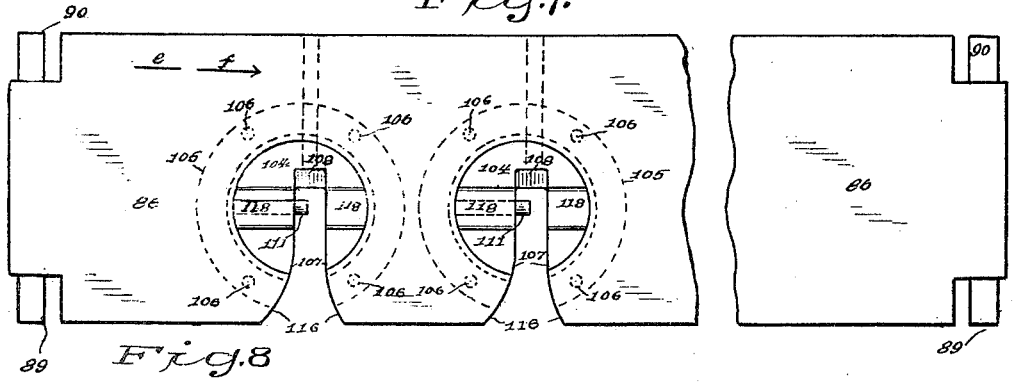
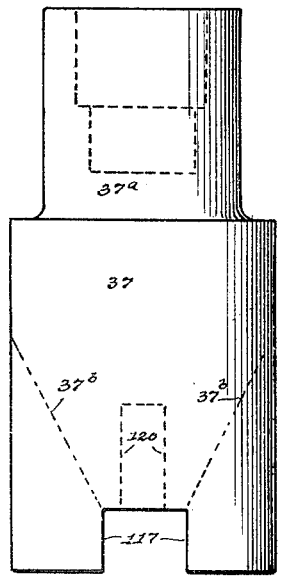
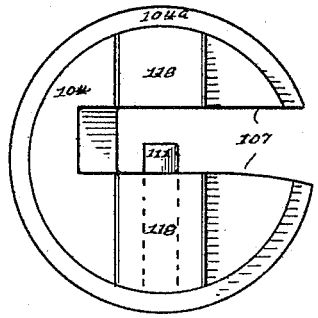
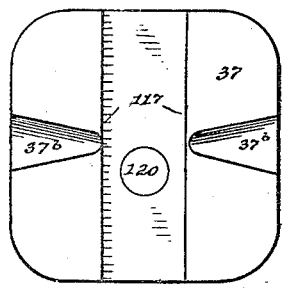
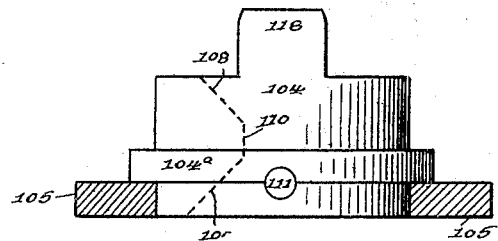
WITNESSES
INVENTOR
Franklin B. Shuster
By his Atty
Geo. D. Phillips No. 690,037. Patented Dec. 31, 1901.
F. B. SHUSTER.
BALE TYING ATTACHMENT FOR COMPRESSORS.
(Application filed June 8, 1899.)
(No Model.) 5 Sheets—Sheet 5.
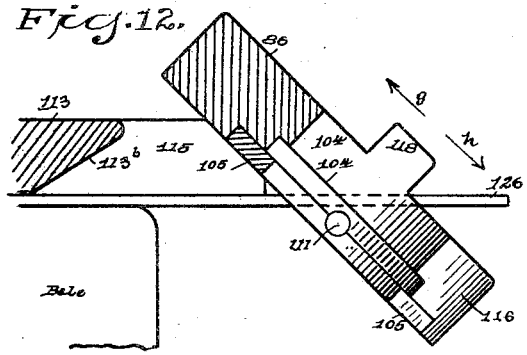
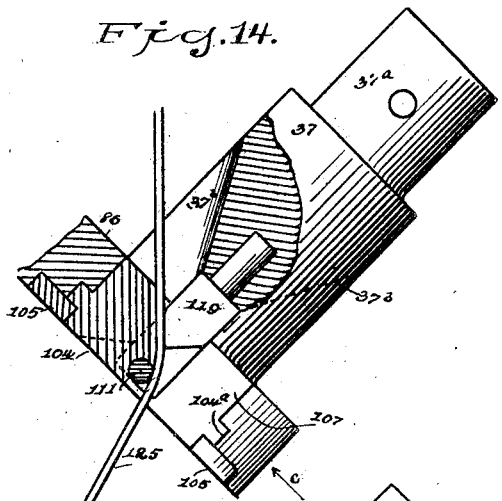
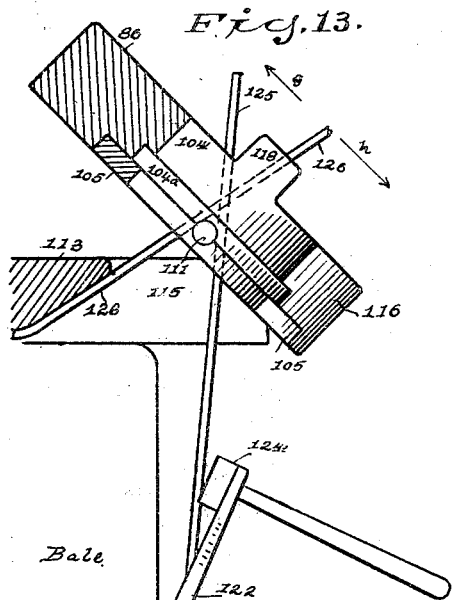
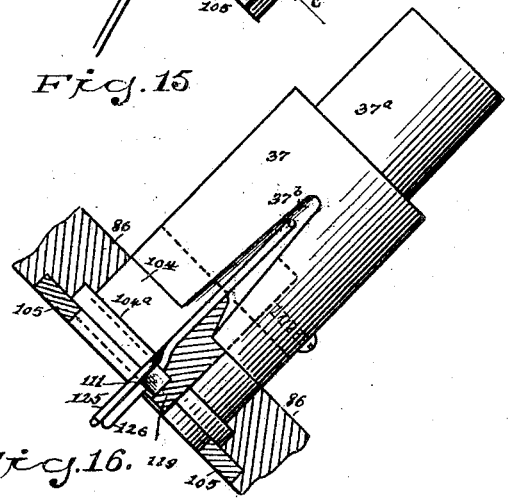
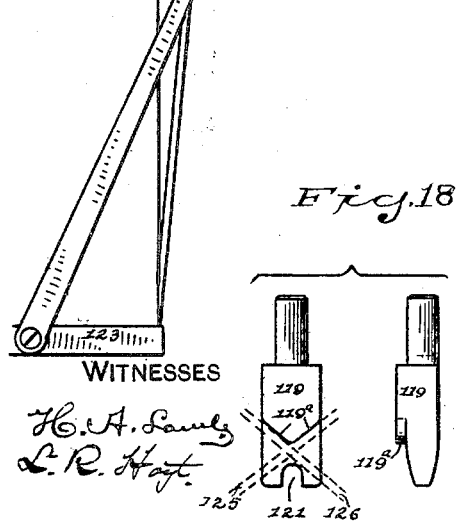
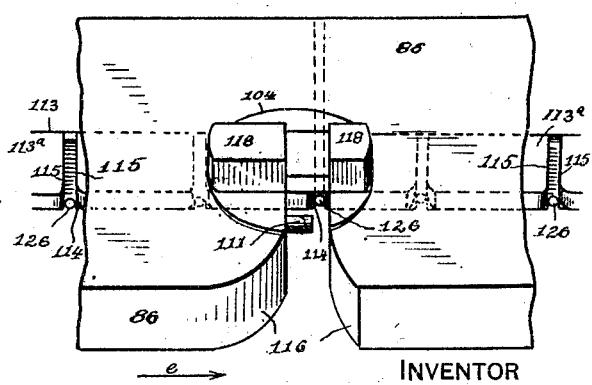
WITNESSES
H. A. Lauly
L. R. Hoyt
INVENTOR
Franklin B. Shuster
By his Atty.
Geo. O. Phillips
THE NORRIS PETERS CO., PHOTO-LITHO., WASHINGTON, D. C.

UNITED STATES PATENT OFFICE.

FRANKLIN B. SHUSTER, OF NEW HAVEN, CONNECTICUT, ASSIGNOR TO AARON F. CHURCHILL, OF BRUNSWICK, GEORGIA.

BALE-TYING ATTACHMENT FOR COMPRESSORS.

SPECIFICATION forming part of Letters Patent No. 690,037, dated December 31, 1901.

Application filed June 8, 1899. Serial No. 719,765. (No model.)

*To all whom it may concern:*

Be it known that I, FRANKLIN B. SHUSTER, a citizen of the United States, and a resident of New Haven, in the county of New Haven and State of Connecticut, have invented certain new and useful Improvements in Bale-Tying Attachments for Compressors, of which the following is a specification.

My invention relates to an improvement in bale-tying machines for cotton-compressors; and it consists in certain details of construction to be more fully set forth in the following specification and such features believed to be new and novel particularly pointed out in the claims.

To enable others to understand my invention, reference is had to the accompanying drawings, in which—

Figure 1 represents a side elevation of the bale-tying machine and engine for driving same, broken view of the upper and lower platens of a cotton-compressor with a bale of cotton compressed between the supplementary platens of the compressor. Fig. 2 is a broken rear elevation of the tying-machine with the engine removed, broken section of the upper supplementary platen of the compressor. Fig. 3 is a side elevation looking in the direction of arrow $a$, Fig. 2, of the traveling carriage that carries the twister-driving devices and broken view of the guide-rod on which such carriage operates. Fig. 4 is broken rear elevation of the traveling carriage looking in the direction of arrow $b$ of Fig. 3, broken view of the auxiliary driving-shaft-supporting bracket, and one of the twister-drivers mounted upon their supporting-rods. Fig. 5 is a detail end view of the bar carrying the rotary twisters, side elevation of the guide-rod operating said bar, supporting-rollers for said rod, and pinion-engaging teeth in such rod by means of which said bar is given a longitudinal movement, also sectional view of the bosses supporting the rolls. Fig. 6 is a detail side elevation of one of the twister-drivers rotatively mounted in its supporting-bracket, spiral driving-gear therefor, sectional view of the tubular supporting-rods from which such bracket is suspended. Fig. 7 is a detail broken upper plan view of the sliding bar carrying the rotary wire-twisters. Fig. 8 is a detail side elevation of one of the twister-drivers. Fig. 9 is a detail plan view of the lower face of the twister-driver shown at Fig. 8 looking in the direction of arrow $w$. Fig. 10 is a detail upper plan view of one of the rotary wire-twisters. Fig. 11 is a detail side elevation of one of the rotary wire-twisters and sectional view of the ring that retains such twister in the sliding or twister-carrying bar. Fig. 12 is a broken sectional view of the upper supplementary platen of a cotton-compressor, broken view of a cotton-bale, sectional view of the sliding or twister-carrying bar with a wire-twister therein, sectional view of its retaining-ring, said sliding bar in its lowest position to receive the entering end of a bale-wire. Fig. 13 is a broken sectional view of the upper and lower supplementary platens, broken view of a cotton-bale between the two supplementary platens, sectional view of the sliding twister-carrying bar and a rotary twister therein, said bar moved up to its highest position and carrying with it the upper leg of a bale-wire, the lower leg shown carried up by means of a folder pivotally supported on the lower supplementary platen. Fig. 14 is a detail broken view, partly in section, of one of the twister-drivers and twister-carrying bar, sectional view of a twister in said bar and engaged by said driver, section of a bale-wire engaged by the twister, locking-plug to prevent the bale-tie wires becoming disengaged from the twister-pin. Fig. 15 is a detail broken sectional view of twister-carrying bar, twister therein, elevation of a twister-driver engaging said twister with the pin of such twister engaged with the cross bale-wires, and sectional view of the locking-plug looking in the direction of arrow $c$ of Fig. 14. Fig. 16 is a broken perspective front elevation of the twister-carrying bar with a twister mounted therein, upper supplementary platen, showing the relative position of the twister-pin and the upper leg of a bale-wire before the said bar is shifted to the right. Fig. 17 is a view similar to Fig. 16 with the twister-carrying bar shifted to the right, so as to carry the twister-pin under the bale-wire. Fig. 18 shows detail front and side elevations of the locking-plug, showing dotted wires engaged therewith. Fig. 19 is a detail broken view of the front edge of the upper supplementary platen of the compressor and a section of a bale-wire projecting therefrom. Fig. 20 is a view similar to Fig. 19 looking in the direction of arrow d. Fig. 21 is a detail broken side elevation of a cotton-bale fully compressed, also broken view of a bale-wire about such bale, with the free ends thereof twisted about each other at the upper corner of the bale.

Its construction and operation are as follows:

1 and 2 represent the side frames supporting the mechanism relating to the bale-tying attachment. The traveling carriage which supports the twister-drivers and the mechanism operating them is represented by the side plates 3, 4, 5, and 6. Antifriction-rolls are rotatably mounted on studs between these two pairs of plates, and as the construction of the pair of plates 3 and 4 is similar to the plates 5 and 6 a brief description of the former will suffice.

7, 8, 9, and 10 are studs which not only keep the plates apart but serve as a bearing for the rolls 11, 12, 13, and 14. The lower rolls 15 and 16, mounted upon their studs 17 and 18 are shown between the plates 5 and 6 at Fig. 2, and in Fig. 4 is seen one only of the upper rolls—viz., 19—mounted upon its stud 20.

21 and 22 are guide-rods running between each pair of these rolls, the ends of which rods are secured to the brackets 23, 24, 25, and 26, Fig. 2, projecting from the inner faces of the two supporting standards or frames 1 and 2.

Projecting from the inner faces of the two plates 3 and 5 and integral therewith are the bosses 27, 28, 29, 30, 31, 32, 33, and 34, in which bosses are mounted the shafts and rods presently to be described.

35 and 36 are two large tubular rods anchored in the bosses 29, 30, 33, and 34. These rods carry a plurality of the twister-drivers, one being shown at Fig. 4. As these several drivers are all constructed exactly alike a brief description of one and its appurtenances will suffice.

37 is one of a series of twister-drivers that engages with the wire rotary twisters presently to be more fully described. 37ª, Figs. 14 and 15, is the shank of such driver, which shank is inserted in the lower end of the bracket 38. 39 is a shaft rotatably mounted in said bracket, whose lower end is secured to the shank of the driver 37 by means of the pin 40.

41 is a spiral gear on the outer end of the shaft 39, which gear registers with the spiral gears 42, Figs. 2 and 4, of the shaft 43. The bracket 38 has the hub branches 44 and 45, that encircle with the tubular shafts 35 and 36 and are secured firmly thereto. These brackets carrying the twister-drivers are distributed along these two shafts at regular intervals and in numbers equal the number of grooves in the platen and the bale-wires therein.

46, Figs. 1, 2, and 4, is a driving-shaft journaled in the bosses 27 and 28. One end of such shaft is also journaled in the bracket 47, loosely embracing the vertical driving-shaft 48, connected with the engine 49.

50 is a bevel-gear near the upper end of shaft 48, which gear registers with the bevel-gear 51 of the shaft 46. The lower end of the shaft 48 is journaled in the rotatable bearing 52, projecting from the engine. 53 is another bevel-gear on the shaft 48, registering with the bevel-gear 54 on the end of the engine-driving shaft. By this arrangement the power is transmitted from the engine through the vertical shaft 48 to the horizontal driving-shaft 46. It being understood that the shaft 48 swings with its bearing 52 as the carriage travels up and down on the rods 21 and 22, therefore the upper gear 50 on such shaft will have a longitudinal movement thereon and will be rotated by means of the key 55. On the opposite end of the horizontal driving-shaft 46 is mounted the pinion 56, which pinion registers with the gear 57, Figs. 1, 3, and 4, mounted upon the worm-gear shaft 43. This gear runs normally loose on its shaft and is brought into engagement therewith by a clutch-locking bolt 58, whose outer end is shown at Fig. 4.

59 is a handle-lever carrying the adjustable screw 60, that engages with the lever 61, overlying said locking-bolt, as shown at Fig. 1.

62 is a dial-wheel, and 63 is a pin projecting from the flange 64 of the shaft 43 to engage with and drive said dial-wheel.

65 is a stop-lever to engage with the pin 66, and it is actuated by the spring-pin 67 to lock the dial-wheel. However, this clutch mechanism forms no part of my present invention, and therefore a further detail description of it is unnecessary.

Referring to Figs. 1, 2, and 5, 68 and 69 are guide-rods supported by the rolls 70, 71, 72, 73, 74, 75, 76, and 77, mounted on pins supported in the bosses 78, 79, 80, 81, 82, 83, 84, and 85, projecting from the inner faces of the side frames or standards 1 and 2. The upper ends of these guide-rods are connected to the twister-carrying bar 86, one only of such connections being shown at Figs. 1 and 5. The other is located at the opposite end of the sliding bar. A brief description of one will, however, answer for both.

87 and 88 are short arms secured to the upper end of the rod 68, and 89 and 90 are trunnions projecting laterally from each end of the bar 86, and these trunnions are journaled in holes provided in said arms.

91 is a handle-lever mounted on the opposite end of the guide-rod 68, whereby said rod is partially rotated in either direction, so as to impart a reciprocating movement to the sliding twister-bar 86 in the direction of arrow e or f. (Shown at Figs. 2 and 7.) Teeth 92 are formed in the lower surface of the rod 68 and 69 to be engaged by gears 93, one only being shown at Figs. 1 and 5. These gears are mounted on the shafts 94 and 95, journaled in the side frames 1 and 2. 96 and 97 are sprocket-wheels mounted on these shafts, said wheels carrying the sprocket-chains 98 and 99, which chains pass over the upper sprocket-wheels 100 and 101, mounted on the shaft 102.

103 is a hand-wheel mounted upon the shaft 94 for operating both rods, and thus imparting a reciprocating movement to the twister-carrying bar 86 in the direction of arrows $g$ and $h$. (Shown at Figs. 12 and 13.)

104 represents rotatable wire-twisters mounted at short intervals in the bar 86 and corresponding in numbers to the twister-drivers connected with the traveling carriage before described. As all of these twisters are exactly alike, a brief description of one will answer for all. These twisters are seated at intervals in the bar 86 and are adapted to be freely rotated therein. The opening or seat in said bar conforms to the shape of the twisters, so that its flange $104^a$, combined with the ring 105 and the screws 106, will maintain such twisters in place.

107 is an opening, Fig. 10, in the twister, which opening extends through one side of the ring 105 (see also Figs. 12 and 13) and also through the twister-carrying bar to admit the bale-wires, presently to be described. This opening or cut in the twister extends back beyond the center and tapers off both ways, as indicated by the dotted lines 108 and 109, (shown at Fig. 11,) leaving the straight portion or kicking-post 110.

111 is a pin in one side of the twister, which pin extends about midway into the opening 107.

112 and $112^a$, Fig. 1, represent the upper and lower platens of the press, to which are detachably secured the supplementary platens 113 and 123. These supplementary platens are provided with a plurality of grooves adapted to admit bale-wires. One of said grooves 114 in the upper supplementary platen is shown at Figs. 16, 17, and 20. This groove is cut clear through the front end of the supplementary platen 113 to form the side walls 115 to coincide with the opening 107 in the twister and the openings 116 of the sliding twister-carrying bar 86.

The lower end of the twister-driver is provided (see Figs. 8 and 9) with the transverse slot or opening 117 in its lower end or face, adapted to be brought into engagement with the narrow projection 118, rising from the upper surface of the rotary twister.

119 is a plug, Fig. 18, having a shank adapted to enter into the hole 120, Fig. 9, of the twister-driver, which hole is located to one side of the center of said driver, so that when the driver and twister are brought into engagement the free end of this plug will fill the opening between the outer end of the twister-pin 111 and the opposite side wall of the opening 107 of the twister, as shown at Figs. 14 and 15. The shouldered portion of said plug will rest against the bottom of the square slot 117, which slot is shown at Figs. 8 and 9. Referring to Fig. 18, 121 is an opening in the lower end of said plug to allow the end of the said twister-pin to enter, or, in other words, to allow said plug to straddle the end of said pin.

122 is one of the two folder-arms pivotally supported on each side of the lower supplementary platen 123, Fig. 13, having the cross-bar 124, joining these arms, one only of said arms being shown and adapted to carry up all of the lower legs of the bale-wire, of which one only—viz., 125—is shown.

When the cotton-bale is being compressed, the twister-driver mechanism and the twister-carrying bar are in their normal position, as shown at Figs. 1 and 12. While the lower platen is rising the bale-wire is inserted from the rear of the press into the grooves of the upper and lower supplementary platens 113 and 123. The upper leg 126 of said wire will pass through the opening in the twister and project far enough beyond to leave sufficient stock to effect a twist with the lower leg of said wire when the same is thrown up. This will leave the twister-pin 111 below the upper leg 126, and such leg and pin will be in the position shown at Fig. 16. Then by means of the handle-lever 91 of the guide-rod 68 said rod is partially rotated, so as to bring the twister-carrying bar 86 to the right in the direction of arrow $e$. This will bring leg 126 of the bale-wire against the opposite wall of the opening in the twister and directly under control of the twister-pin, as shown at Fig. 17. The hand-wheel 103, Fig. 1, mounted upon the shaft 94, is then manipulated so as to bring the twister-carrying bar, which bar always rests on the incline face $113^a$, Fig. 19, of the supplementary platen 113, up in the direction of arrow $g$ to its highest position, as shown at Fig. 13. This will also lift the end of the upper leg of the bale-wire against the incline wall $113^b$, Fig. 12, which wall is at the bottom of the groove or opening in the front end of the said supplementary platen. The folder is then brought into requisition to carry the lower leg of the tie against the outside of the twister-pin, as shown at Fig. 13. This will leave the said pin between the wires in readiness to twist the same. The carriage on which the rotatable twister-drivers are mounted is operated to bring about the engagement of said drivers and twisters by means of the shaft 128, Fig. 1, carrying the sprocket-wheel 129 and the hand-wheel 130. 131 is another sprocket-wheel mounted on the upper shaft 132, connected to the lower sprocket-wheel by means of the sprocket-chain 133. 134 and 135 (see also Fig. 2) are winding-pulleys mounted on the shaft 132, whose chains 136 and 137 are connected to one of the hubs of the carriage, as shown. By this arrangement the said carriage is moved up and down on its guide-rods. When, therefore, the twister-carrying bar is in the position shown at Fig. 13 and the wires of the bale-tie are also in the position as shown, then the carriage is lowered and the twisters and their drivers interlock, as shown at Fig. 15. The two wires are now crossed, as shown at Fig. 13, so that when the twister is brought down the angular projection 119ª, (see also Fig. 18,) formed on the front face of the plug 119, will strike against the upper side of the intersecting wires and force then firmly against the twister-pin 111. The mechanism for rotating the drivers 37 is then set in motion by means of the handle-lever 59, as before mentioned. This will rotate the twisters in the bar 86 a sufficient number of times to effect a twist of the proper strength to hold the bale, as shown at Fig. 21. The number of revolutions made by the said twisters is determined by the number of teeth in the dial-wheel 62, Fig. 1, which twisters are brought to a standstill as soon as said dial-wheel has completed a revolution. The carriage is then run back and the twister-carrying bar moved longitudinally back to its normal position, as shown at Fig. 16, so that the twisted ends of the wires can be liberated from the twister-pin, and then said bar is angularly moved back to its normal position (shown at Fig. 12) to enable such twisted ends to clear the twister when the bale is ejected from the press.

37ᵇ represents grooves formed in the side of the several twister-drivers to allow the bale-wires to draw in and hug close to the said drivers.

The upper supplementary platen projects beyond the bale, as will be observed. This feature, combined with the open wire-grooves extending entirely through this projecting portion of said platen, enables the upper leg of the bale-wire to be carried or deflected up, so that when the lower leg of said wire is folded up the intersection of these legs will take place over the upper corner of the bale. By so doing the strain on each leg is equal and the wire is not apt to break while twisting.

While I show and claim a horizontally-operating bar for supporting a series of twisters, I do not wish to be confined strictly thereto, but hold myself at liberty to employ any other device for holding and carrying the twisters.

Having thus described my invention, what I claim as new, and desire to secure by Letters Patent, is—

1. The improvement in a bale-tying machine for cotton-compressors, consisting of a series of rotatable twisters provided with means for engaging the free ends of bale-wires, a support in which said twisters are rotatably mounted, means whereby said support is shifted to elevate the projecting ends of the upper legs of the bale-wires, and means for effecting a movement at right angles to said first movement, for the purpose set forth.

2. The improvement in a bale-tying machine for cotton-compressors, consisting of a series of rotatable twisters, means on said twisters for engaging with the free ends of a bale-wire, a support in which said twisters are rotatably mounted, means whereby said support is moved longitudinally and at right angles thereto, a series of twister-drivers overlying such twisters and movably brought into engagement therewith, for the purpose set forth.

3. The improvement in a bale-tying machine of the character described, consisting of a series of rotatable twisters having openings in one side thereof and mounted in a supporting-bar having corresponding openings in one side thereof to admit the bale-wires, twister-pins in said twisters, the whole so combined so that, the wire-grooves of the platen and the openings in the said twisters and bar will coincide to admit said wires above the twister-pins when said bar is in its normal position, means whereby said wires are deflected upward by said bar, combined with rotatable twister-drivers, for the purpose set forth.

4. The combination, in a bale-tying machine, consisting of a supporting-bar having a series of openings in one edge thereof, a series of wire-twisters rotatably mounted in said bar and having openings in one side thereof which openings correspond to those of said bar, twister-pins projecting into the openings of said twisters, and means for operating the twisters, for the purpose set forth.

5. The combination, in a bale-tying machine, consisting of a supporting-bar adapted to have a longitudinal movement and a movement at right angles thereto, said bar carrying a series of wire-twisters rotatably mounted therein, said bar and twisters having openings in one side to admit the bale-wires, twister-pins projecting into the openings of said twisters, combined with a series of twister-drivers adapted to be brought into engagement with said twisters, for the purpose set forth.

6. The herein-described wire-twister adapted to be rotated, having an opening in the side thereof, a pin adapted to engage the intersecting wires of a bale-tie, as shown and described, said pin partially spanning said opening, combined with a rotatable driver adapted to engage said twister, a plug in said driver adapted, in combination, with said pin to fill said opening of the twister beyond said pin when said twister and driver are interlocked, for the purpose set forth.

7. The herein-described rotatable wire-twister for bale-tying machines for cotton-compressors, consisting of the body portion 104, said body portion having opening 107 therein, said opening extending beyond the center, and inclines 108 and 109 at the bottom of said opening or groove, twister-pin 111, for the purpose set forth.

8. The herein-described improvement in a cotton-bale-tying machine, consisting of a series of rotatable wire-twisters, a bar in which said twisters are rotatably mounted, said bar adapted to operate along the front edge of a grooved press-platen, and inclined with relation thereto, means for operating said bar longitudinally and at right angles to such longitudinal movement so as to elevate one of the wires of a bale-wire, openings in the said twisters and bar to admit the bale-wire, twister-pins located below such wire when said bar is in its normal position, constructed and operated for the purpose set forth.

9. In a bale-tying machine for cotton-compressors, of the character described, in combination with a rotatable twister, of a twister-driver, consisting of a body portion, a rotatable support therefor, means on said driver to engage with and rotate said twister, incline grooves in the side of said driver to admit the free ends of a bale-wire, for the purpose set forth.

10. The combination, in a bale-tying machine for cotton-compressors, consisting of supporting-standards, a carriage operatively mounted thereon, a series of wire-twister drivers rotatably mounted on said carriage, a series of wire-twisters rotatably mounted in a bar, said bar adapted to have a longitudinal movement and a movement at right angles thereto, for the purpose set forth.

11. The combination, in a bale-tying machine for cotton-compressors, consisting of a bar or other like support, a series of independently-rotatable twisters carrying twister-pins mounted therein, openings in said twisters and bar to admit the upper free ends of bale-wires, said bar adapted to be moved longitudinally to bring said upper ends above said twister-pins, and a movement at right angles thereto so as to elevate said ends, means whereby the lower ends or legs of said bale-wires are carried up against the opposite side of said pins and a series of rotatable twister-drivers adapted to be brought into engagement with said twisters, for the purpose set forth.

12. The combination, in a bale-tying machine for cotton-compressors, consisting of a bar carrying a series of independently-rotatable twisters, means on said twisters for engaging the free ends of wire bale-ties, supporting-rods pivotally connected to each end of said bar, means whereby said rods are rotated so as to impart a longitudinal movement to said bar, and means whereby said bar is operated at right angles to such longitudinal movement, for the purpose set forth.

13. The combination, in a bale-tying machine of the character described, consisting of supporting-standards, a traveling carriage mounted between said standards, a series of rotatable wire-twister drivers mounted on said carriage, a power driving-shaft connected with an engine, or other like source of power, and said carriage, a swiveled connection for said shaft so as to maintain a working connection with said carriage in any of its traveled positions, for the purpose set forth.

14. The combination, in a bale-tying machine adapted for use in connection with a compressor of the character described, consisting of a sliding bar carrying a series of rotatable twisters, said bar and twisters having openings coinciding with each other when in their normal position, combined with the upper platen having an overhanging edge or extension projecting outward in close proximity to said sliding bar, said platen having grooves to admit bale-wires, the overhanging edge or extension having open slots in line with the openings in said sliding bar, for the purpose set forth.

15. In a bale-tying machine for cotton-compressors, the combination, in a twister-driver adapted to engage a wire-twister having twister-pins for effecting a twist in the free ends of a wire bale-tie, of a plug adapted to prevent the disengagement of the wire from said pin, a shouldered portion on said plug to force the intersection of such wires against said pin, for the purpose set forth.

Signed at Bridgeport, in the county of Fairfield and State of Connecticut, this 7th day of June, A. D. 1899.

FRANKLIN B. SHUSTER.

Witnesses:
SIG. DORMITZER,
F. A. FAIRCHILD.